United States Patent [19]
Borcherds

[11] Patent Number: 5,766,700
[45] Date of Patent: Jun. 16, 1998

[54] LOOP FASTENING DEVICE

[75] Inventor: Cedric M. Borcherds, 10 Kellaway Place, Wetherill Park, New South Wales 2164, Australia

[73] Assignee: Cedric M. Borcherds, Turrumarra, Australia

[21] Appl. No.: 695,222

[22] Filed: Aug. 6, 1996

[51] Int. Cl.$^6$ .................................................. F16G 11/14
[52] U.S. Cl. .................................................. 428/5; 428/99
[58] Field of Search ............................... 428/4, 5, 99

[56] References Cited

U.S. PATENT DOCUMENTS

| | | | |
|---|---|---|---|
| 2,585,781 | 2/1952 | Johnson | 428/16 X |
| 2,849,821 | 9/1958 | Doig | 428/5 |
| 3,922,407 | 11/1975 | Nimmo, Jr. et al. | 428/5 |
| 4,034,443 | 7/1977 | Turner | 24/129 R |
| 4,112,551 | 9/1978 | Sales | 24/712.5 |
| 4,585,676 | 4/1986 | De Smet et al. | 428/5 |
| 5,144,744 | 9/1992 | Campagnoli | 29/446 |
| 5,295,280 | 3/1994 | Hudson et al. | 15/222 |

*Primary Examiner*—Henry F. Epstein
*Attorney, Agent, or Firm*—Workman, Nydegger & Seeley

[57] ABSTRACT

A loop fastening device comprises a hollow generally conical body with an opening at its base and a slotted aperture at its apex. Extending through the slotted aperture in frictional engagement therewith is a flexible line or cord formed as a closed loop extending from the base of the conical body. The closed loop is passed around an object and the conical body and the remainder of the line or cord are passed through the closed loop to form a double strand loop extending about the body. Engagement of the body against the closed loop prevents disengagement therebetween.

20 Claims, 3 Drawing Sheets

LOOP FASTENING DEVICE

BACKGROUND OF THE INVENTION

This invention relates generally to a loop fastening device and more specifically to a device for securing a loop in a flexible line, cord or rope tied around an object to prevent disengagement of the looped connection.

The device permits rapid and secure attachment of a loop around an object and of the loop to be readily tensioned to secure against loosening or disengagement.

Hitherto, there have been many proposals for loop fastening devices for securing a looped cord or line about an object.

While generally effective for their respective intended purposes, such prior art devices are usually designed for a specific application and consequently suffer a number of disadvantages which might otherwise prevent a broader range of application.

One such prior art device is disclosed in U.S. Pat. No. 4,034,443. This patent is concerned with a knot-tying device in the form of a triangular plate having a small aperture adjacent an apex of the plate and a larger aperture in the centre of the plate. A free end of a line or cord is passed through the smaller aperture and knotted on one side of the plate to secure the line or cord thereto. The line or cord is then looped around an object to be secured and a further looped portion of line or cord is pushed through the larger central aperture and looped over the two corners of the plate opposite the apex. Tension on the loop secured around the object secures the knot and the divergent sides of the plate prevent accidental disengagement of the looped portion of line or cord from the plate.

The main application described for this device is to secure a small boat to a mooring post with an intentioned loop.

Another prior art device is described U.S. Pat. No. 4,112,551 relating to a draw strings puller and fastener for shoes or bags. The draw strings puller and fastener comprises a hollow frusto conical body with the free ends of a loop extending through opposed apertures in the side wall of the hollow body and emerging from a divergent open end thereof. The free ends of the loop are secured in a tapered plug which is inserted into the open end of the body when the loop is tensioned to wedgingly engage the drawstring between the tapered plug and body walls.

The present invention seeks to overcome or ameliorate at least some of the disadvantages associated with prior art loop fastening devices.

STATEMENT OF THE INVENTION

It is an object of the invention to provide a simple yet effective means for fastening a looped cord, line or rope about an object without the necessity for typing a knot.

It is a further object of this invention to provide a releasable loop fastening device for securing a cord, line or rope under tension about an object.

It is another object of this invention to provide an inexpensive, compact loop fastening device without unnecessarily protruding portions which may give rise to injury to a user.

A loop fastening device comprises a body having a generally circular base and one or more centrally located apertures through which portions of a line or cord can pass in frictional engagement to form a loop on one side of the body, the loop, in use, being extendable about an object with the remaining portions of the line or cord with the body passing through the looped end whereby the body engages over the looped end to prevent disengagement of a looped connection formed thereby.

In accordance with these and other objects which will be apparent hereinafter, the present invention will now be described with particular reference to the accompanying drawings.

DETAILED DESCRIPTION OF PREFERRED EMBODIMENTS

Figure 1:
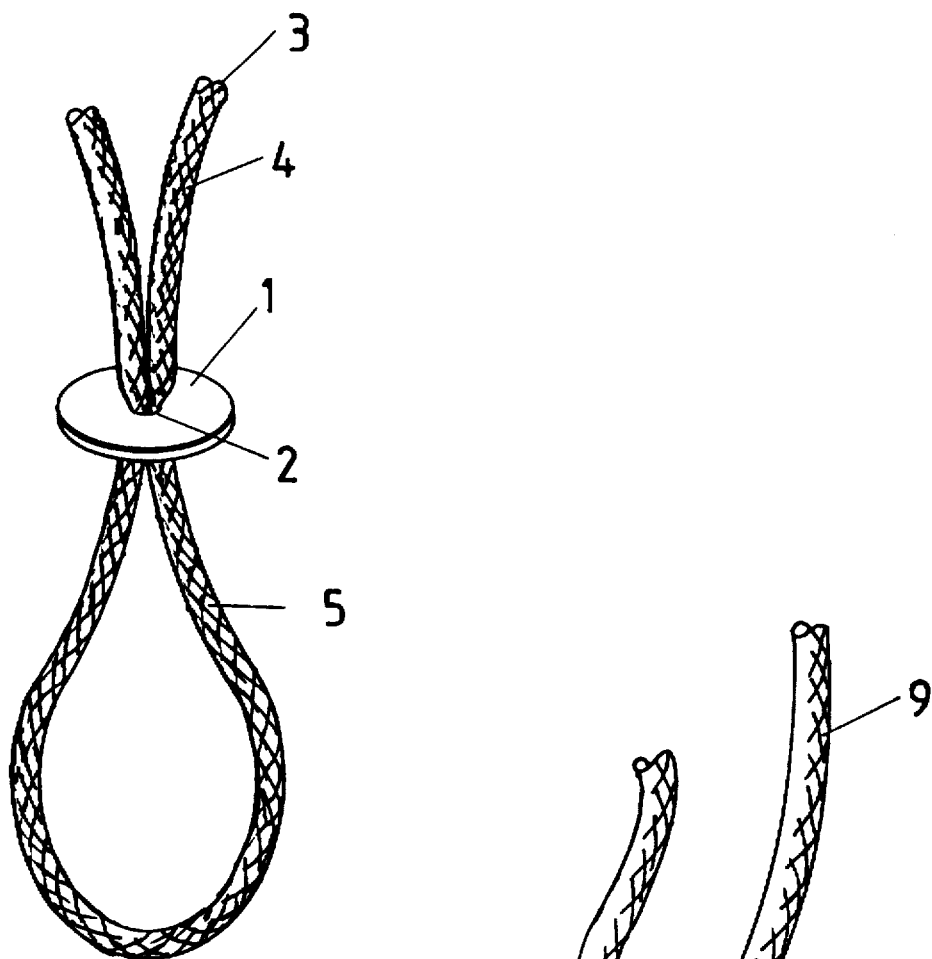
FIG. 1 is a perspective view of one embodiment of the invention.

In FIG. 1, the loop fastener comprises a metal or, preferably, a plastics disc 1 with a slotted aperture 2 through which the free ends 3 of a line or cord 4 extend to form a closed loop 5 on the opposite side of disc 1.

The size of the slotted aperture and the line or cord are chosen to permit a slidable frictional engagement between the aperture 2 and the line or cord 4. Similarly the thickness of disc 1 may be increased if required to provide a greater frictional contact between the aperture wall and the line or cord. Instead of a slotted aperture to accommodate paired strands of line or cord, separate or adjoining apertures (not shown) may be provided.

Either or both of disc 1 and line or cord 4 may be resiliently deformable to enhance frictional engagement between the inner wall(s) of the aperture(s) and the strands of line or cord.

The line or cord 4 may be chosen from a plastics monofilament which is at least partially resilient in a radial direction. Preferably the line or cord 4 comprises a soft knitted or braided cord made from natural fibres such as cotton or synthetic fibres such as polyethylene, polypropylene or PET (Polyethylene-terephthalate) which is capable of substantial radial compression as it passes through a restricted aperture.

To assist in attaching the line or cord 4 to disc 1, the aperture 2 may be formed in a frusto-conical shape with an enlarged entry on one side of the disc and a restricted exit on the other side of the disc. The angle formed between the aperture wall and the disc face at the exit is an acute angle providing a relatively sharp edge to enhance frictional engagement with the line or cord, particularly when the plane of the disc is tilted relative to a plane normal with the longitudinal axes of the strands passing through the disc.

In use, the looped end 5 of the line or cord 4 is passed around an object such as the neck of a sack and the free ends 3, together with the disc 1 are looped through looped end 5 to form a double strand loop (not shown). Supporting the disc 1 with say, a thumb and forefinger, the free ends 3 are drawn through aperture 2 to tightly close the neck of the sack.

As the double strand loop so formed is under tension, the looped end 5 is locked against the undersurface of disc 1 to prevent its disengagement and thus loosening of the loop fastener.

The disc 1 may be of any desired shape but preferably is circular to avoid sharp pointed edges which could cause injury when coming into contact with a user. Similarly, the disc may be of any desired diameter but needs only to be of a diameter sufficient to cover the looped end 5 where it engages about the paired strands passing therethrough.

Figure 2:
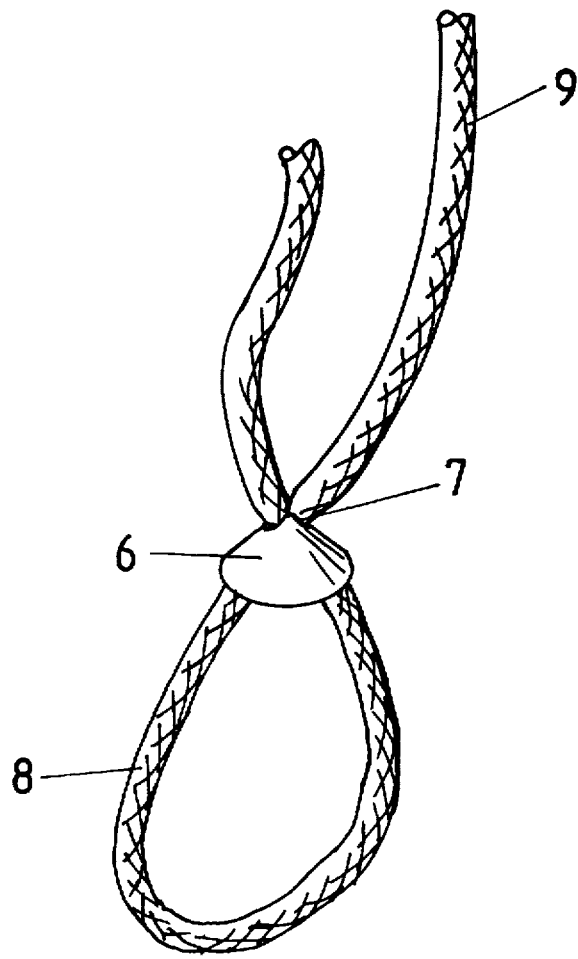
FIG. 2 is a perspective view of an alternative embodiment of the invention.

FIG. 2 shows an alternative and particularly preferred embodiment of the invention. In this embodiment the loop fastener comprises a hollow, generally conical wall 6 with a slotted aperture 7 at the apex thereof.

A loop 8 of a radially compressible braided or knitted cord 9 of PET is conveniently inserted through aperture 7 from within the convergently tapering conical wall 6.

In use, the loop fastener of FIG. 2 is employed as a double stranded tensioned loop in a fashion similar to the embodiment of FIG. 1.

Figure 3:
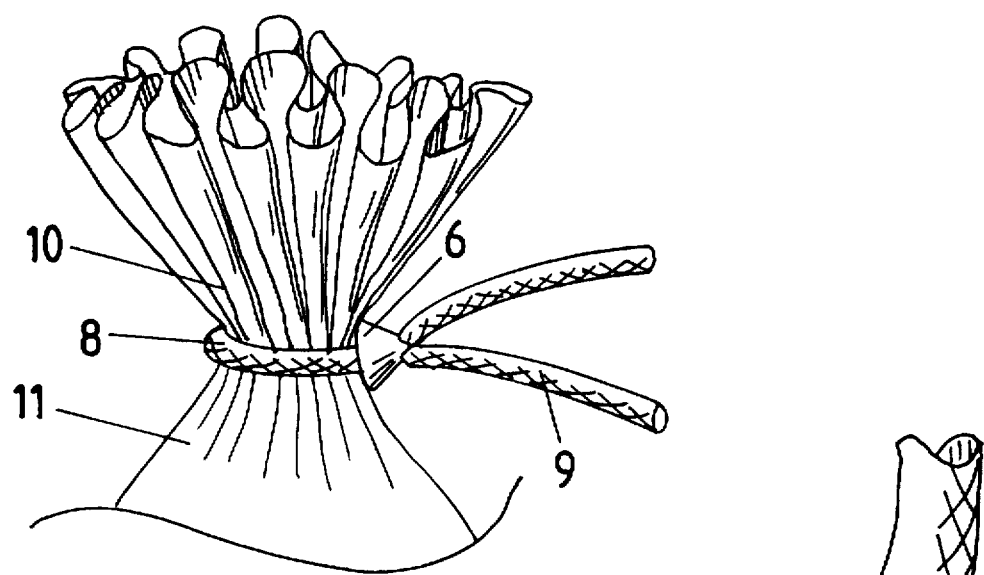
FIG. 3 is a part side elevational view of the embodiment of FIG. 2 in looped engagement with the neck of a sack.

FIG. 3 shows a part side elevational view of the loop fastener of FIG. 2 engaged about the neck 10 of a sack or bag 11.

To release the loop fastener, the conical member 6 is simply grasped by the thumb and forefinger and drawn along the free ends 9 of the cord until tension is released sufficiently to enable the looped end 8 to pass over the conical member 6. In industrial applications for, say, wheat sacks and the like, a bifurcated tool may be employed to grasp and loosen the conical member 6.

As shown in FIG. 3, the free ends 9 of the cord may be knotted to retain the conical member captive or they could be joined together by knotting or fusion welding to form a continuous loop.

Figure 4:
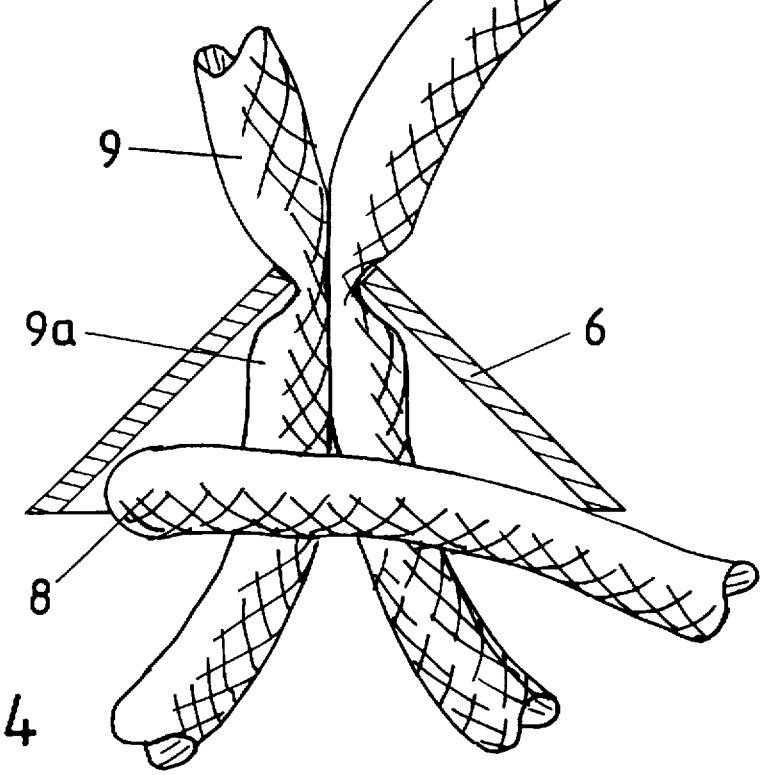
FIG. 4 is an enlarged part side elevational view of the loop fastening illustrated in FIG. 3.

FIG. 4 is an enlarged partial cross sectional view of the loop fastener of FIGS. 2 and 3 in an engaged position.

As shown in FIG. 4 the looped end 8, as it wraps around paired strands 9a under tension is partially enclosed within the hollow interior of conical member 6 to increase the locking effect of the loop fastener by enhancing the frictional engagement between the loop 8 and the paired strands 9a.

FIG. 4 illustrates quite clearly the compact nature and simple operation of the loop fastener according to the invention.

The conical members are conveniently and inexpensively formed by injection moulding from a rigid or semi-rigid plastics composition such as nylon, polycarbonate, polystyrene, ABS (acrylonitrilebutadienestyrene) or the like.

Figure 5:
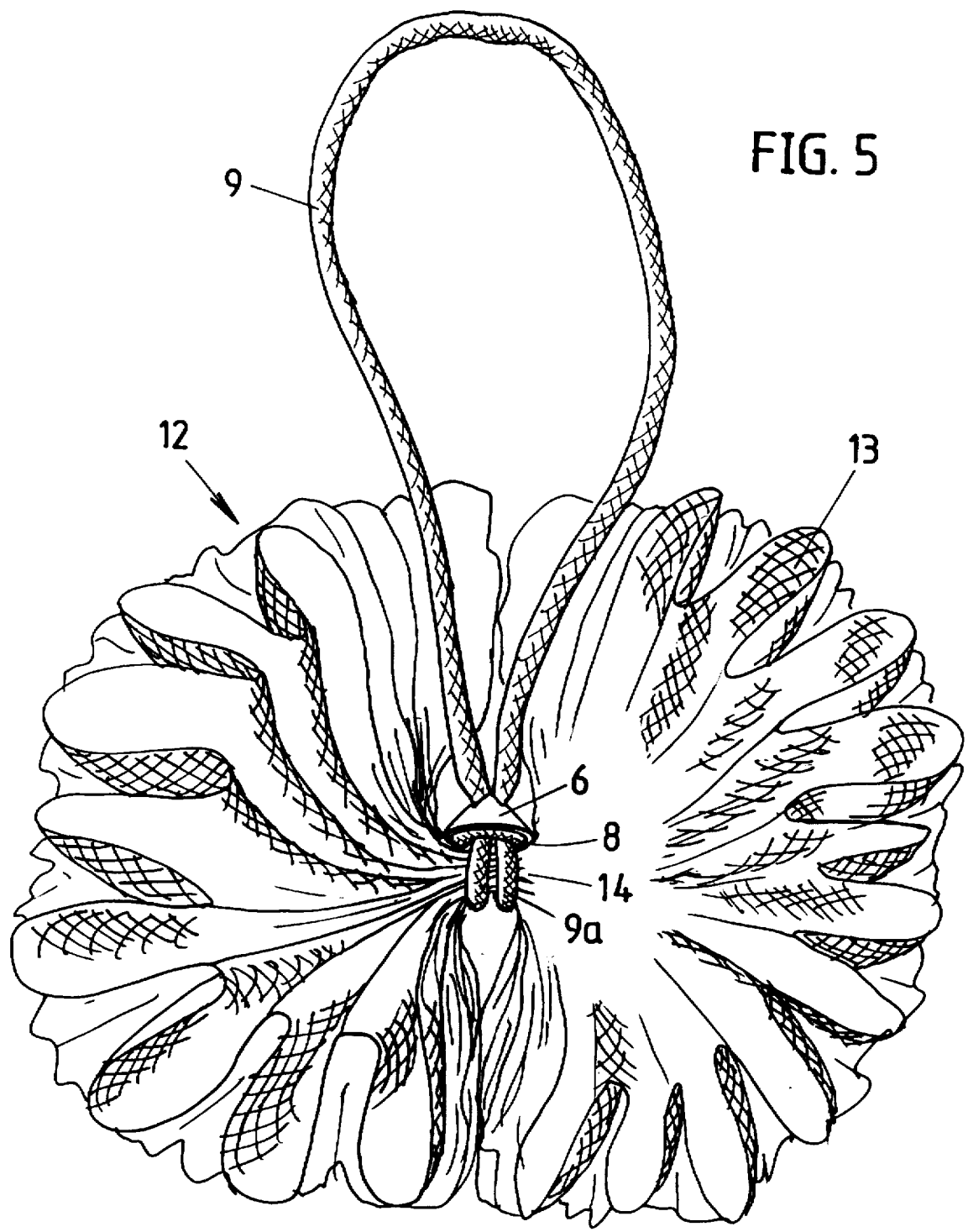
FIG. 5 is a partially broken away view of a bath ruffle made with the loop tying device of FIGS. 2 and 3.

FIG. 5 shows in partial cross-section a particularly advantageous application of the loop fastener in the form of a bath ruffle or bathing sponge 12 for personal hygiene.

Hitherto, bath ruffles or bathing sponges have been made by gathering a soft resilient mesh fabric into a loose ball and then tightly knotting a cord about the middle of the ball to hold it together. The resilient nature of the mesh fabric causes the gathered material to regain a ball shape about the knotted centre.

After trimming the loose ends of the securing knot, a length of soft braided cord was then passed through the tightly bound central portion with a large needle and, after removing the needle from the cord, the free ends of the cord were fusion welded to form a continuous loop with which to hang up the bath ruffle.

Having regard to the minimal value of the materials content, the prior art method of manufacturing bath ruffles has an excessively high labour content even fro cheap labour countries.

As shown in FIG. 5 the loop fastener according to the invention provides a simple and inexpensive alternative to the conventional method of manufacturing bath ruffles.

In FIG. 5, the bath ruffle 12 comprises an extruded net 13 of polyethylene or the like which is loosely gathered into a ball and then secured in one step about its central region 14 by a loop fastener as shown in FIGS. 2 and 4.

The free ends 9 are conveniently joined by fusion welding to form a continuous loop before attachment of a conical member 6 thereto.

After forming a double strand loop about the central region 14 the loop is tensioned in a single movement to complete the bath ruffle 12.

Not only does the loop fastener according to the invention provide a secure, slip free means of securing the bath ruffle, its configuration is such that there are no protruding edges to cause injury to a bather during use.

The present invention has been shown and described herein in what are considered to be the most practical and preferred embodiments. It is recognised however that departures may be made therefrom within the scope of the invention and that obvious modifications will occur to a person skilled in the art.

For example the body of the loop securing device may be in the form of a spherical shape or an inverted cone wherein the base of the body is at the convergent end of the cone although these embodiments are considered to form a less secure closure than the preferred embodiments.

What I claim is:

1. A loop securing device comprising, in combination:
   a body having a generally circular base and one or more centrally located apertures therein and,
   a flexible line or cord frictionally engaged within said one or more apertures to form a closed loop having a looped end, said closed loop extending from said base on one side and a remainder of the flexible line or cord extending from said base on the opposite side, the closed loop in use being extendible around an object with the body and remainder of the flexible line or cord extending through the closed loop to form a double strand loop around the object whereby the body engages against the looped end to prevent disengagement therebetween.

2. A loop securing device as claimed in claim 1 wherein the body has a centrally located slotted aperture.

3. A loop securing device as claimed in claim 1 wherein the body is substantially disc shaped.

4. A loop securing device as claimed in claim 1 wherein the body is substantially conical in shape.

5. A loop securing device as claimed in claim 4 wherein the base of the body is at a divergent end thereof.

6. A loop securing device as claimed in claim 5 wherein the body is formed as a hollow member having an open base.

7. A loop securing device as claimed in claim 1 wherein the line or cord has free ends located on the opposite side of the body from the looped end.

8. A loop securing device as claimed in claim 1 wherein the line or cord is formed as a continuous loop.

9. A loop securing device as claimed in claim 1 wherein the body is slidably engaged on said line or cord.

10. A loop securing device as claimed in claim 1 wherein said body is comprised of a rigid material and said line or cord is comprised of a resilient radial deformable material.

11. A loop securing device as claimed in claim 1 wherein said body is comprised of a resiliently deformable material.

12. A loop securing device as claimed in claim 1 wherein said body and said line or cord are both comprised of a resiliently deformable material.

13. A loop securing device as claimed in claim 1 wherein said line or cord is comprised of knitted or braided fibres.

14. A loop securing device as claimed in claim 1 wherein said one or more centrally located apertures are formed with at least one sharp edge between an interior wall of said one or more apertures and a surface of said body.

15. A bath ruffle comprising a mass of mesh-like fabric secured about a central region by a loop securing device comprising:

a body having a generally circular base and one or more centrally located apertures therein and, a flexible line or cord frictionally engaged within said one or more apertures to form a closed loop having a looped end, said closed loop extending from said base on one side and a remainder of the flexible line or cord extending from said base on the opposite side, the closed loop in use being extendible around said central region in tension with the body and remainder of the flexible line or cord extending through the closed loop to form a double strand loop around the central region whereby the body engages against the looped end to prevent disengagement therebetween.

16. A bath ruffle as claimed in claim 15 wherein the body comprises a hollow generally conical member with an opening at a divergent end thereof.

17. A bath ruffle as claimed in claim 16 wherein the closed loop is contained at least partially within the hollow generally conical member.

18. A bath ruffle as claimed in claim 15 wherein the body is comprised of a rigid plastics material.

19. A bath ruffle as claimed in claim 15 wherein the line or cord is comprised of knitted or braided fibres.

20. A bath ruffle as claimed in claim 15 wherein the mesh-like fabric is comprised of an extruded mesh of polymeric material.

* * * * *